United States Patent
Liu et al.

(10) Patent No.: US 12,089,190 B2
(45) Date of Patent: Sep. 10, 2024

(54) SIGNAL SENDING METHOD, SIGNAL RECEIVING METHOD, SENDING DEVICE, AND RECEIVING DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 674 days.

(21) Appl. No.: 17/211,931

(22) Filed: Mar. 25, 2021

(65) Prior Publication Data
US 2021/0235430 A1    Jul. 29, 2021

Related U.S. Application Data

(63) Continuation of application No. PCT/CN2019/102513, filed on Aug. 26, 2019.

(30) Foreign Application Priority Data

Sep. 26, 2018 (CN) .......................... 201811126458.6

(51) Int. Cl.
*H04W 72/04* (2023.01)
*H04L 5/00* (2006.01)
(Continued)

(52) U.S. Cl.
CPC ......... *H04W 72/044* (2013.01); *H04L 5/0048* (2013.01); *H04W 56/001* (2013.01); *H04W 72/02* (2013.01); *H04W 74/0833* (2013.01)

(58) Field of Classification Search
CPC ... H04B 17/318; H04L 5/0048; H04L 5/0092; H04L 5/0053; H04W 4/00; H04W 4/40;
(Continued)

(56) References Cited

U.S. PATENT DOCUMENTS 10,028,125 B2 * 7/2018 Chen ..................... H04W 72/20
11,510,179 B2 * 11/2022 Chae ................. H04W 72/0453
(Continued)

FOREIGN PATENT DOCUMENTS

CN    104796845 A    7/2015
CN    105992364 A    10/2016
(Continued)

OTHER PUBLICATIONS

Intel Corporation, Sidelink Synchronization for NR V2X Communication, 3GPP TSG RAN WG1 Meeting #94, R1-1808695, 11 pages, Aug. 20-24, 2018.*
(Continued)

*Primary Examiner* — Frank Duong
(74) *Attorney, Agent, or Firm* — IPX PLLC

(57) ABSTRACT

The present disclosure provides a signal sending method, a signal receiving method, a sending device, and a receiving device. The signal sending method is performed by the sending device, where the method includes: sending a first signal to the receiving device, where the first signal includes the following information: timing information; device identification information; group identification information; resource configuration information; first signal transmission information; beam transmission information; and possibly other information.

20 Claims, 3 Drawing Sheets

(51) Int. Cl.
*H04W 56/00* (2009.01)
*H04W 72/02* (2009.01)
*H04W 72/044* (2023.01)
*H04W 74/0833* (2024.01)

(58) Field of Classification Search
CPC ....... H04W 4/44; H04W 24/10; H04W 28/02; H04W 56/00; H04W 56/001; H04W 72/02; H04W 72/044; H04W 72/0446; H04W 72/0453; H04W 72/046; H04W 72/08; H04W 74/0833; H04W 92/18
See application file for complete search history.

(56) References Cited

U.S. PATENT DOCUMENTS

| | | | |
|---|---|---|---|
| 11,812,397 B2 * | 11/2023 | Lee | H04W 72/0453 |
| 2018/0049073 A1 | 2/2018 | Dinan et al. | |
| 2018/0213499 A1 * | 7/2018 | Lee | H04W 56/002 |
| 2020/0053835 A1 * | 2/2020 | Ye | H04L 1/08 |
| 2021/0058914 A1 * | 2/2021 | Chae | H04B 7/0695 |
| 2021/0168574 A1 * | 6/2021 | Zhang | H04W 8/005 |

FOREIGN PATENT DOCUMENTS

| | | |
|---|---|---|
| CN | 108023698 A | 5/2018 |
| CN | 108029005 A | 5/2018 |
| CN | 108419295 A | 8/2018 |

OTHER PUBLICATIONS

International Search Report issued in corresponding International Application No. PCT/CN2019/102513, mailed Nov. 29, 2019, 4 pages.

* cited by examiner

SIGNAL SENDING METHOD, SIGNAL RECEIVING METHOD, SENDING DEVICE, AND RECEIVING DEVICE

CROSS-REFERENCE TO RELATED APPLICATIONS

This application is a bypass continuation of PCT Application No. PCT/CN2019/102513, filed Aug. 26, 2019, which claims priority to Chinese Patent Application No. 201811126458.6 filed in China on Sep. 26, 2018. Both priority applications are incorporated herein by reference in their entireties.

TECHNICAL FIELD

The present disclosure relates to the field of communications technologies, and in particular, to a signal sending method, a signal receiving method, a sending device, and a receiving device.

BACKGROUND

There are two types of terminals for transmission on a sidelink:
1. Terminal with configuration A: A network side device sends allocation of sidelink transmission resources on a current carrier. After receiving allocation information, a terminal selects sidelink transmission resources indicated by the network side device, and performs sidelink transmission based on the sidelink transmission resources indicated by the network side device.
2. Terminal with configuration B: A terminal selects sidelink transmission resources from a resource pool of a pre-configuration of a manufacturer.

The terminal with configuration A may obtain, from the network side device, related information of tdd-config and sidelink synchronization resources. Because there is no network coverage, the terminal with configuration B usually may obtain tdd-config and determine the sidelink synchronization resources only from the pre-configuration of the manufacturer.

The related technologies have the following problems:

According to a first aspect, a network in NR supports very flexible uplink and downlink configuration, which indicates that overhead signaling required by this configuration is much greater than that of LTE. A quantity and flexibility of uplink and downlink configurations of the pre-configuration of the manufacturer are limited, and the uplink and downlink configurations configured by the network and the uplink and downlink configurations of the pre-configuration of the manufacturer may be different, so that terminals in different modes may interfere with each other. Even when the terminals in two modes are aligned with each other in timing or have the same synchronization source, and use the same sidelink resource, the two terminals may have different understanding of DFNs, and as a result, may interfere with each other.

According to a second aspect, different terminals may select the same synchronization source, sidelink synchronization resource, and synchronization signal sequence, but content carried in MIB-SL-V2X may be the same or different. In this case, a receiving terminal may receive, from one resource, synchronization signal sequences and MIB-SL-V2X of a plurality of sending devices. However, the receiving terminal cannot directly distinguish different MIB-SL-V2X by detecting the synchronization signal sequences, and cannot uniquely determine the sending devices by decoding different MIB-SL-V2X. Therefore, a measured result is actually superposition of signals of a plurality of sending devices, which is not accurate, and beam-related operations cannot be performed in a multi-beam scenario.

SUMMARY

The technical problem to be resolved by the present disclosure is to provide a signal sending method, a signal receiving method, a sending device, and a receiving device, so that the receiving device may determine information about the sending device by detecting a signal, which facilitates subsequent operations such as measurement, merging, decoding, and management, and improves transmission accuracy.

To resolve the foregoing technical problem, embodiments of the present disclosure provide the following technical solutions:

According to a first aspect, an embodiment of the present disclosure provides a signal sending method applied to a sending device, where the method includes:
  sending a first signal to a receiving device, where the first signal includes at least one of the following information:
  timing information;
  device identification information;
  group identification information;
  resource configuration information;
  first signal transmission information;
  beam transmission information; and
  other information.

According to a second aspect, an embodiment of the present disclosure provides a signal receiving method applied to a receiving device, where the method includes:
  receiving a first signal from a sending device, where the first signal includes at least one of the following information:
  timing information;
  device identification information;
  group identification information;
  resource configuration information;
  first signal transmission information;
  beam transmission information; and
  other information.

According to a third aspect, an embodiment of the present disclosure provides a sending device, including:
  a sending module, configured to send a first signal to a receiving device, where the first signal includes at least one of the following information:
  timing information;
  device identification information;
  group identification information;
  resource configuration information;
  first signal transmission information;
  beam transmission information; and
  other information.

According to a fourth aspect, an embodiment of the present disclosure provides a receiving device, including:
  a receiving module, configured to receive a first signal from a sending device, where the first signal includes at least one of the following information:
  timing information:
  device identification information:
  group identification information:

resource configuration information:
first signal transmission information:
beam transmission information; and
other information.

According to a fifth aspect, an embodiment of the present disclosure provides a network node, including a memory, a processor, and a computer program that is stored in the memory and that can run on the processor, where when the computer program is executed by the processor, steps in the foregoing signal sending method are implemented, or steps in the foregoing signal receiving method are implemented.

According to a sixth aspect, an embodiment of the present disclosure provides a computer readable storage medium, where the computer readable storage medium stores a computer program, and when the computer program is executed by a processor, steps in the foregoing signal sending method are implemented, or steps in the foregoing signal receiving method are implemented.

The embodiments of the present disclosure have the following beneficial effects:

In the foregoing solution, a sending device sends a first signal to a receiving device, where the first signal includes at least one of the following information: timing information; device identification information; group identification information; resource configuration information; first signal transmission information; beam transmission information; and other information. Through the technical solution of the present disclosure, the receiving device may determine information about the sending device by detecting the first signal, which facilitates subsequent operations such as measurement, merging, decoding, and management, and improves transmission accuracy.

DESCRIPTION OF EMBODIMENTS

To make the to-be-resolved technical problem, the technical solution, and the advantages in the embodiments of the present disclosure clearer, detailed descriptions are provided below with reference to the accompanying drawings and specific embodiments.

There are two types of terminals for transmission on a sidelink:
1. Terminal with configuration A: A network side device sends allocation of sidelink transmission resources on a current carrier. After receiving allocation information, a terminal selects sidelink transmission resources indicated by the network side device, and performs sidelink transmission based on the sidelink transmission resources indicated by the network side device.
2. Terminal with configuration B: A terminal selects sidelink transmission resources from a resource pool of a pre-configuration of a manufacturer.

In a Long Term Evolution (LTE) sidelink, the sidelink reuses uplink resources of LTE. A sidelink terminal sends a Primary Sidelink Synchronization Signal (PSSS), Secondary Sidelink Synchronization Signal (SSSS), and a sidelink master information block (MasterInformationBlock-SL-V2X, MIB-SL-V2X) on the sidelink. The PSSS and the SSSS are used to help a receiving terminal obtain frame-level timing information. A PSSS sequence in LTE sidelink is a ZC sequence, but the PSSS uses a logical root different from that of a Primary Synchronization Signal (PSS) of the LTE. Therefore, the PSSS sequence and the PSS sequence of the LTE are essentially different sequences. The SSSS reuses a sequence design of a Secondary Synchronization Signal (SSS). When an identifier (ID) corresponding to the PSSS is the same as an identifier corresponding to the PSS, and an ID corresponding to the SSSS is the same as an ID corresponding to the SSS, an SSSS sequence is the same as an SSS sequence.

Figure 1:
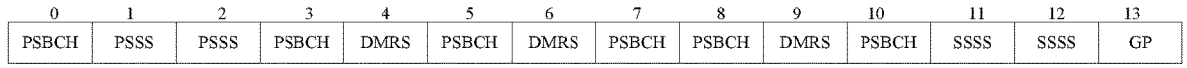
FIG. 1 is a schematic diagram of a time domain structure of PSSSs and SSSSs in LTE V2V.

A time domain structure of PSSSs and SSSSs in LTE V2V are shown in FIG. 1.

The MIB-SL-V2X carries information such as tdd-config, a direct frame number (Direct Frame Number, DFN), and bandwidth. The DFN is used to help a receiving terminal obtain frame-level timing information of a sending terminal. The tdd-config provides uplink (Uplink, UL)/downlink (Downlink, DL) configuration. For brevity, resources used to transmit the PSSS, the SSSS, and the MIB-SL-V2X are referred to as sidelink synchronization resources for short.

The terminal with configuration A may obtain, from the network side device, related information of tdd-config and sidelink synchronization resources. Because there is no network coverage, the terminal with configuration B usually may obtain tdd-config and determine the sidelink synchronization resources only from the resource pool of the pre-configuration of the manufacturer.

The terminal with configuration A may send, in its MIB-SL-V2X, the tdd-config, the DFN, and the bandwidth configuration that are obtained from the network side device, and the terminal with configuration B may send, in its MIB-SL-V2X, the tdd-config, the DFN, and the bandwidth of the pre-configuration of the manufacturer.

The terminal first determines uplink subframes, downlink subframes, and special subframes in radio resources based on the tdd-config. Then, the terminal deletes, from the radio resources, resources occupied by the downlink subframes and sidelink synchronization resources, arranges the remaining resources in time sequence, and numbers the remaining resources by using 10 ms as a sidelink frame, where the number is the DFN.

Figure 2:
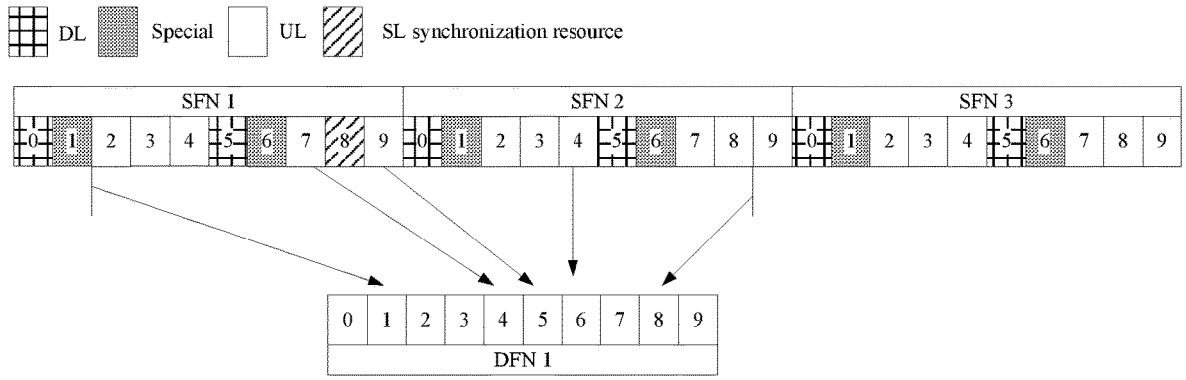
FIG. 2 is a schematic diagram of DFN numbering.

According to a schematic diagram shown in FIG. 2, it is assumed that all UL subframes are reused for SL transmission, where a subframe 8 in an SFN 1 is used for transmission of an SL synchronization signal.

There are only 6 uplink/downlink configurations supported in the LTE, and a unit of configuration is a subframe.

Moreover, there are dozens of uplink/downlink configurations supported in the New Radio (NR), and a unit of configuration may be a symbol. In addition, a flexible symbol is also introduced in the NR. A network side device may dynamically configure and change uplink/downlink configurations on the flexible symbol, and a quantity of supported configurations may further be expanded in subsequent evolution.

In the NR, the NR base station needs to send a synchronization signal block (an SS block, an SSB, also referred to as an SS/a PBCH block, a synchronization signal/physical broadcast signal block), so that the terminal can perform synchronization, system information obtaining, measurement evaluation, and the like. One SSB consists of an NR-SS and an NR-PBCH (Physical Broadcast Channel), where the NR-SS is divided into an NR-PSS and an NR-SSS. One SSB includes four symbols in total, and a time domain composition sequence of these symbols in one SSB is PSS-PBCH-SSS-PBCH.

Figure 3:
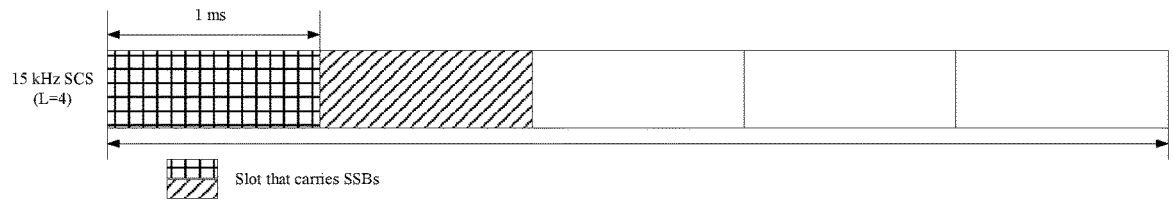
FIG. 3 is a schematic diagram of a location of a slot that carries an SSB.

For a specific frequency domain, assuming that at most L SSBs are sent in one period, the L SSBs are transmitted in a 5 ms time window according to a time domain position defined by a protocol, that is, the SSBs are periodically transmitted in the 5 ms window. As shown in FIG. 3, L=4, a subcarrier spacing SCS=15 kHz, and there are two SSBs in a slot. A position of the slot that carries the SSBs in the 5 ms window is shown in FIG. 3.

A length of a radio frame is 10 ms, but an SSB time window has only 5 ms. Therefore, a base station may use a 1-bit half frame indicator (half frame indicator, HFI) to notify a terminal whether the time window is located in a first half frame or a second half frame, and the base station may also indicate an index of each SSB.

The related technologies have the following problems:

According to a first aspect, a network in NR supports very flexible uplink and downlink configuration, which indicates that overhead signaling required by this configuration is much greater than that of LTE. A quantity and flexibility of uplink and downlink configurations of the pre-configuration of the manufacturer are limited, and the uplink and downlink configurations configured by the network and the uplink and downlink configurations of the pre-configuration of the manufacturer may be different, so that terminals in different modes may interfere with each other. Even when the terminals in two modes are aligned with each other in timing or have the same synchronization source, and use the same sidelink resource, the two terminals may have different understanding of DFNs, and as a result, may interfere with each other.

According to a second aspect, different terminals may select the same synchronization source, sidelink synchronization resource, and synchronization signal sequence, but content carried in MIB-SL-V2X may be the same or different. In this case, a receiving terminal may receive, from one resource, synchronization signal sequences and MIB-SL-V2X of a plurality of sending devices. However, the receiving terminal cannot directly distinguish different MIB-SL-V2X by detecting the synchronization signal sequences, and cannot uniquely determine the sending devices by decoding different MIB-SL-V2X. Therefore, a measured result is actually superposition of signals of a plurality of sending devices, which is not accurate, and beam-related operations cannot be performed in a multi-beam scenario.

To resolve the foregoing problem, embodiments of the present disclosure provide a signal sending method, a signal receiving method, a sending device, and a receiving device, so that the receiving device may determine information about the sending device by detecting a signal, which facilitates subsequent operations such as measurement, merging, decoding, and management, and improves transmission accuracy.

The technical solution in this embodiment is not only applicable to sidelink communication, but also applicable to other communications systems. The sidelink may also be referred to as a side link or a direct link, which belongs to the same concept.

Figure 4:
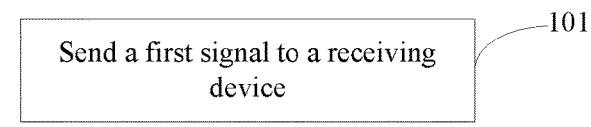
FIG. 4 is a schematic flowchart of a signal sending method according to an embodiment of the present disclosure.

An embodiment of the present disclosure provides a signal sending method applied to a sending device. As shown in FIG. 4, the method includes the following step:

Step 101: Send a first signal to a receiving device, where the first signal includes at least one of the following information:
  timing information:
  device identification information:
  group identification information:
  resource configuration information:
  first signal transmission information:
  beam transmission information; and
  other information.

The device identification information may be identification information of the receiving device or identification information of the sending device. When the receiving device is a terminal, the sending device includes at least one of a network side device and another terminal. When the sending device is the another terminal, the device identification information may be identification information of the another terminal.

In this embodiment, a sending device sends a first signal to a receiving device, where the first signal includes at least one of the following information: timing information; device identification information; group identification information; resource configuration information; first signal transmission information; beam transmission information; and other information. Through the technical solution of the present disclosure, the receiving device may determine information about the sending device by detecting the first signal, which facilitates subsequent operations such as measurement, merging, decoding, and management, and improves transmission accuracy.

Further, the method further includes:
  determining at least one of the following based on at least some of the information included in the first signal:
  a sequence of a reference signal;
  a sequence of a synchronization signal;
  a sequence of a measurement signal; and
  a sequence of a random access signal.

Optionally, the method further includes: selecting, by the terminal, one sequence of the reference signal, the synchronization signal, and/or the measurement signal from a plurality of candidate sequences of the reference signal, the synchronization signal, and/or the measurement signal. At least one of the phrases connected by "and/or" is present.

Further, the first signal includes at least one of the following:
  a broadcast channel, a reference signal, a synchronization signal, a measurement signal, a random access signal, and a data channel.

Further, the broadcast channel carries the at least some of the information included in the first signal; and/or
  the data channel carries the at least some of the information included in the first signal, which is applicable to a two-step random access procedure. At least one of the phrases connected by "and/or" is present.

Further, the method further includes: determining at least one of the following based on the at least some of the information carried in the broadcast channel: the sequence of the reference signal, the sequence of the synchronization signal, and the sequence of the measurement signal; and/or determining at least one of the following based on the at least some of the information carried in the data channel: the sequence of the reference signal, and the sequence of the random access signal. At least one of the phrases connected by "and/or" is present.

Further, the method includes at least one of the following:

determining, based on the at least some of the information carried in the broadcast channel and a corresponding mapping, the sequence of the reference signal, the synchronization signal, and/or the measurement signal;

determining, based on the at least some of the information carried in the broadcast channel and a corresponding mapping, a plurality of candidate sequences of the reference signal, the synchronization signal, and/or the measurement signal, and selecting one sequence of the reference signal, the synchronization signal, and/or the measurement signal from the plurality of candidate sequences of the reference signal, the synchronization signal, and/or the measurement signal;

generating, based on the at least some of the information carried in the broadcast channel, the sequence of the reference signal, the synchronization signal, and/or the measurement signal; and selecting, based on the at least some of the information carried in the broadcast channel, one sequence of the reference signal, the synchronization signal, and/or the measurement signal from a plurality of candidate sequences of the reference signal, the synchronization signal, and/or the measurement signal.

At least one of the phrases connected by "and/or" is present.

Further, the method includes at least one of the following:

determining, based on the at least some of the information carried in the data channel and a corresponding mapping, the sequence of the reference signal and/or the random access signal;

determining, based on the at least some of the information carried in the data channel and a corresponding mapping, a plurality of candidate sequences of the reference signal and/or the random access signal, and selecting one sequence of the reference signal and/or the random access signal from the plurality of candidate sequences of the reference signal and/or the random access signal;

generating, based on the at least some of the information carried in the data channel, the sequence of the reference signal and/or the random access signal; and selecting, based on the at least some of the information carried in the data channel, one sequence of the reference signal and/or the random access signal from the plurality of candidate sequences of the reference signal and/or the random access signal.

At least one of the phrases connected by "and/or" is present.

Further, the at least some of the information included in the first signal includes at least one of the following:

device identification information, and an identifier of the first signal.

Further, the timing information includes at least one of the following:

frame information, slot information, an identifier of the first signal, an identifier of a transmission direction, and an identifier of a resource set to which the first signal belongs.

Further, the resource set is at least one of the following: time domain resources occupied by N first signals; frequency domain resources occupied by N first signals; a frequency domain range to which N first signals belong; and a time range to which N first signals belong, where N is a positive integer. The time domain resources occupied by N first signals indicates time domain symbols occupied by N first signals, the time range to which N first signals belong indicates a time range to which the time domain symbols occupied by N first signals belong, and the frequency domain range to which N first signals belong indicates a frequency domain range to which the frequency domain resources occupied by N first signals belong.

Further, the resource configuration information includes at least one of the following:

uplink and downlink resource configuration information; and sidelink resource configuration information.

Further, the uplink and downlink resource configuration information is obtained in at least one of the following manners:

obtained through configuration from a network side device;

obtained through pre-configuration; and obtained implicitly through a resource pool.

Further, the sidelink resource configuration information indicates at least one of the following: a sidelink resource part and a non-sidelink resource part.

Further, the sidelink resource configuration information is at least one of the following forms:

a bitmap;

a resource pattern identifier; and a resource identifier.

Further, the first signal transmission information includes at least one of the following: information of a first signal that is actually transmitted; and information of a first signal that is allowed to be transmitted.

Further, the beam transmission information includes at least one of the following:

information of a beam that is allowed to be transmitted;

information of a beam that is actually transmitted; and information of a beam corresponding to the current first signal.

Further, the other information includes at least one of the following:

power information; and subsequent communication information.

Further, the subsequent communication information includes at least one of the following:

configuration information of subsequent communication; and a mapping relationship between the first signal and a resource of a resource pool.

Further, the first signal is used to perform at least one of the following:

synchronization;

measurement;

power control;

directional information providing; and directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

Figure 5:
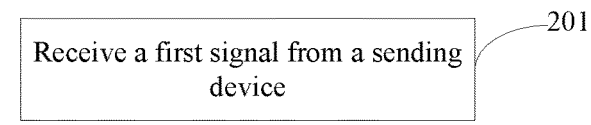
FIG. 5 is a schematic flowchart of a signal receiving method according to an embodiment of the present disclosure.

An embodiment of the present disclosure further provides a signal receiving method applied to a receiving device. As shown in FIG. 5, the method includes the following step:

Step 201: Receive a first signal from a sending device, where the first signal includes at least one of the following information:
- timing information;
- device identification information;
- group identification information;
- resource configuration information;
- first signal transmission information;
- beam transmission information; and
- other information.

In this embodiment, a sending device sends a first signal to a receiving device, where the first signal includes at least one of the following information: timing information; device identification information; group identification information; resource configuration information; first signal transmission information; beam transmission information; and other information. Through the technical solution of the present disclosure, the receiving device may determine information about the sending device by detecting the first signal, which facilitates subsequent operations such as measurement, merging, decoding, and management, and improves transmission accuracy.

Further, the first signal includes at least one of the following:
- a broadcast channel, a reference signal, a synchronization signal, a measurement signal, a random access signal, and a data channel.

Further, the broadcast channel carries the at least some of the information included in the first signal; and/or
the data channel carries the at least some of the information included in the first signal.

At least one of the phrases connected by "and/or" is present.

Further, the at least some of the information included in the first signal includes at least one of the following:
- device identification information, and an identifier of the first signal.

Further, the timing information includes at least one of the following:
- frame information, slot information, an identifier of the first signal, an identifier of a transmission direction, and an identifier of a resource set to which the first signal belongs.

Further, the resource set is at least one of the following:
- time domain resources occupied by N first signals;
- frequency domain resources occupied by N first signals;
- a frequency domain range to which N first signals belong; and
- a time range to which N first signals belong, where
- N is a positive integer.

Further, the resource configuration information includes at least one of the following:
- uplink and downlink resource configuration information; and
- sidelink resource configuration information.

Further, the sidelink resource configuration information indicates at least one of the following: a sidelink resource part and a non-sidelink resource part.

Further, the sidelink resource configuration information is at least one of the following forms:
- a bitmap;
- a resource pattern identifier; and
- a resource identifier.

Further, the first signal transmission information includes at least one of the following:
- information of a first signal that is actually transmitted; and
- information of a first signal that is allowed to be transmitted.

Further, the beam transmission information includes at least one of the following:
- information of a beam that is allowed to be transmitted;
- information of a beam that is actually transmitted; and
- information of a beam corresponding to the current first signal.

Further, the other information includes at least one of the following:
- power information; and
- subsequent communication information.

Further, the subsequent communication information includes at least one of the following:
- configuration information of subsequent communication; and
- a mapping relationship between the first signal and a resource of a resource pool.

Further, the method further includes:
utilizing the first signal to perform at least one of the following:
- synchronization;
- measurement;
- power control;
- directional information providing; and
- directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

The technical solution of the present disclosure will be further described below with reference to specific embodiments:

1. Information that may be carried by the first signal includes at least one of the following:
   (1) timing information, including at least one of the following:
   - frame information, for example, when a signal block is used for a sidelink, it carries DFN information;
   - slot information, for example, a slot index;
   - an identifier of the first signal;
   - an identifier of a transmission direction, for example, 360° is divided into four directions, and identifiers 0, 1, 2, and 3 are used to indicate the four directions; and
   - an identifier of a resource set to which the first signal belongs, where the resource set may be: a set of time domain symbols and/or frequency domain resource elements (Resource Element, RE) or resource blocks (resource block, RB) occupied by N first signals in total, where N>=1; or a set of resources in a time window and/or a frequency domain window to which N first signals belong, where N>=1;

(2) device identification information, for example, an ID of a sending device;
(3) group identification information;
(4) resource configuration information, including at least one of the following: uplink and downlink resource configuration and sidelink resource configuration;
(5) first signal transmission information, including at least one of the following: information of a first signal that is actually transmitted, and information of a first signal that is allowed to be transmitted:
(6) beam transmission information, including at least one of the following: information of a beam that is allowed to be transmitted, information of a beam that is actually transmitted, and information of a beam corresponding to the current first signal;
(7) other information, including power information and subsequent communication information, where the power information includes at least one of the following: a reference signal transmit power: a synchronization sequence transmit power: a broadcast channel transmit power; a measurement signal transmit power: and one power of a reference signal transmit power, a synchronization sequence transmit power, a broadcast channel transmit power, and a measurement signal transmit power, and a power difference between the power and another one or more powers: the subsequent communication information includes at least one of the following: resource indication information of subsequent communication, configuration information of subsequent communication: and a mapping relationship between the first signal and a resource of a resource pool, where the resource indication information includes at least one of the following: a time domain resource, a frequency domain resource, a Band Width Part (BWP), a resource pool, a cell identifier, a carrier identifier, a frequency band identifier, a Subcarrier Spacing (SCS), a Cyclic Prefix (CP), resource pool configuration, control resource configuration, data resource configuration, a monitoring window length, a monitoring period, a modulation and coding strategy MCS, a code rate, a precoding method, a synchronization source, related configuration of a time window for subsequent transmission, and the like.

The time domain resource includes at least one of the following: a time domain resource offset and an occupied time domain symbol. The frequency domain resource includes at least the following: a frequency domain resource offset and an occupied frequency domain resource.

The subsequent communication information includes at least one of the following: a security service message, a basic V2X service message, a periodic service message, a public security service message, and another broadcast message.

2. The first signal includes at least one of the following: a broadcast channel, a reference signal, a synchronization signal, a measurement signal, a data channel, and a random access signal.
(1) Optionally, the first signal includes at least a broadcast channel, a reference signal, and a synchronization signal, where the broadcast channel carries at least some of the foregoing information that needs to be carried.
(2) Optionally, the first signal includes at least a data channel and a reference signal, where the data channel carries at least some of the foregoing information that needs to be carried.
(3) Optionally, when the first signal includes the measurement signal and the reference signal, the measurement signal and the reference signal may be the same signal or different signals.
(4) Optionally, for at least one of the reference signal, the synchronization signal, and the measurement signal in the first signal, a reference/synchronization/measurement signal sequence is determined based on at least some of the foregoing information that needs to be carried (in other words, the reference/synchronization/measurement signal sequence carries at least some of the foregoing information that needs to be carried).

Optionally, a sequence of the measurement signal, the reference signal, and/or the synchronization signal is determined based on at least some of the foregoing information that needs to be carried by the broadcast channel (for example, by using a hash function or other methods such as mapping). Optionally, the at least some includes at least one of device identification information (similar to a UE ID of a sending device) and an identifier of a first signal.

Optionally, a sequence of the random access signal and/or the reference signal is determined based on at least some of the foregoing information that needs to be carried by the data channel (for example, by using a hash function or other methods such as mapping). Optionally, the at least some includes at least one of device identification information (similar to an ID of a sending device) and an identifier of a first signal.

Optionally, a candidate sequence set is determined based on at least some of the foregoing information that needs to be carried by the broadcast channel. Select from the candidate sequence set.

Optionally, a candidate sequence set is determined based on at least some of the foregoing information that needs to be carried by the data channel. Select from the candidate sequence set.

Optionally, a sequence is determined from a candidate sequence set based on at least some of the foregoing information that needs to be carried by the broadcast channel.

Optionally, a sequence is determined from a candidate sequence set based on at least some of the foregoing information that needs to be carried by the data channel.

(5) Optionally, the reference signal is at least one of the following and the measurement signal is at least one of the following (the reference signal and the measurement signal may have the same type or different types, and may be the same signal or different signals):

It may be a demodulation reference signal (demodulation reference signal, DMRS), a channel state information (Channel State Information, CSI)-reference signal (reference signal, RS), a tracking reference signal (tracking reference signal, TRS), a phase tracking reference signal (phase tracking reference signal, PTRS), a sounding reference signal (sounding reference signal, SRS), an SSS, and a PSS.

It may alternatively be another m sequence other than the foregoing signals; another ZC sequence other than the foregoing signals; another gold sequence other than the foregoing signals; or multiplication at least two of the another m sequence, the another ZC sequence, or the another gold sequence. The sequences may be mapped into symbols to perform sequence multiplication.

In different communications systems, names and abbreviations of the foregoing signals may be correspondingly changed. When the abbreviations are changed, the technical solution of the present disclosure is still applicable.

(6) Functions that may be performed on the first signal include at least one of the following:

synchronization:

measurement, including at least one of the following: measurement of radio resource management (radio resource management, RRM); measurement of radio link monitoring (radio link monitoring, RLM): measurement of beam failure detection (beam failure detection, BFD); measurement of CSI, a reference signal received power (Reference Signal Received Power, RSRP), a channel quality indicator (Channel Quality Indicator, CQI), a precoding matrix indicator (Precoding Matrix Indicator, PMI), rank indicator (rank indicator, RI), and the like: and beam management, where a terminal on a receiving side (that is, a receiving device) may compare a measurement result with a determining threshold/corresponding determining process, to determine an evaluation result and/or subsequent steps:

power control:

directional information providing: and directional information obtaining.

Optionally, the directional information includes quasi co-location (Quasi-co-location, QCL) relationship.

Optionally, the first signal is associated with another signal and/or resource pool, and can be used as a QCL reference for the another signal and/or resource pool. In other words, at least one of the following QCL parameters of the first signal and the another signal and/or resource pool is QCL: average delay, delay spread, Doppler shift, Doppler spread, a spatial Rx parameter, and average gain. "and/or" indicates at least one of connected objects.

In Specific Embodiment 1, when the first signal carries the timing information, optionally, the timing information includes DFNs. One DFN defining manner is that a DFN has a length of 10 ms and includes at least one of a sidelink (sidelink, SL) resource part and a non-SL resource part.

For example, a DFN is defined with reference to a form of an SFN, and no DL and/or flexible symbol is excluded based on uplink and downlink configurations of a pre-definition, a configuration, and/or a pre-configuration. In this case, for a terminal that uses configuration of a network side device, a boundary of a DFN is aligned with a boundary of an SFN of the network side device. For a terminal using a pre-configuration, a specific moment in local time is used as 0, and every 10 ms is used as a DFN.

Optionally, from a starting point, the DFN starts from 0 again every 10240 ms, that is, a DFN range is 0-1023.

DFN=(T/10) mod 1024. T is a time interval between a current time and a starting time, a unit is ms, / indicates a division sign, and mod indicates modulo.

In Specific Embodiment 2, when resource configuration information carried by the first signal includes uplink and downlink resource configuration information, the uplink and downlink resource configuration information indicates uplink, downlink, and/or feasible format information within a period of time, and precision of the configuration may be a symbol or a slot or a subframe. For example, it indicates a slot format, that is, a slot format includes downlink symbols, uplink symbols, and flexible symbols.

The uplink and downlink resource configuration information may be obtained by a sending device through configuration of a network side device, or may be obtained by a sending device through pre-configuration, or may be derived by a sending device through a resource pool, for example, derived through a time domain resource of an initial resource pool.

In Specific Embodiment 3, when resource configuration information carried by the first signal includes sidelink resource configuration, optionally, sidelink resource configuration information indicates at least one of an SL resource part and a non-SL resource part, and the foregoing resource includes at least one of a time domain resource and a frequency domain resource.

The sidelink resource configuration information may indicate the SL resource part and the non-SL resource part, or may indicate only one of them, and optionally, the other may be implicitly derived from the former.

Optionally, for the resource occupied by the first signal, the sidelink resource configuration information does not indicate that the corresponding resource is an SL resource. Alternatively, the sidelink resource configuration information indicates that the corresponding resource is an SL resource, but when a resource is reserved, the resource is not considered or a resource set to which the resource belongs is not considered.

"Not Considered" means that if the reserved resource and the resource overlap, it is considered that the overlapped part is used to transmit the first signal. Alternatively, if the reserved resource and resource set to which the resource belongs overlap, it is considered that the overlapped part is used to transmit the first signal.

The sidelink resource configuration information may be at least one of the following forms:

(1) Bitmap form

1 For example, a bitmap is used to indicate a time domain SL resource, where a length of the bitmap is equal to a first value, where an SL time domain resource corresponds to bit=1, and a non-SL time domain resource corresponds to bit=0; or an SL time domain resource corresponds to bit=0, and a non-SL time domain resource corresponds to bit=1.

The first value may be at least one of the following:

a quantity of time domain resources included in at least one resource pool period;

a quantity of time domain resources included in at least one sidelink frame;

a quantity of time domain resources included in at least one sidelink subframe;

a quantity of time domain resources included in at least one sidelink slot; and a quantity of time domain resources included in at least one time window.

For example, a bitmap is used to indicate a frequency domain SL resource, where a length of the bitmap is equal to a second value, where an SL frequency domain resource corresponds to bit=1, and a non-SL frequency domain resource corresponds to bit=0; or an SL frequency domain resource corresponds to bit=0, and a non-SL frequency domain resource corresponds to bit=1.

The second value may be at least one of the following:

a quantity of frequency domain resources included in at least one resource pool;

a quantity of frequency domain resources included in at least one sub-resource pool (sub-channel);

a quantity of frequency domain resources included in at least one BWP; and a quantity of frequency domain resources included in at least one frequency domain window.

③ For example, a bitmap is used to indicate a time domain SL resource and a frequency domain SL resource.

(2) Resource pattern identifier

For example, an identifier 1 indicates that subframes a and b are time domain SL resources.

For example, an identifier 2 indicates that RBs c and d are time domain SL resources.

For example, an identifier 3 indicates that subframes a and b and RBs c and d are SL resources.

(3) Resource identifier, in a form of at least one of the following:

① Resource identifier list

For example, it indicates subframes a and b, which indicates that the subframes a and b are time domain SL resources.

For example, it indicates RBs c and d, which indicates that the RBs c and d are time domain SL resources.

For example, it indicates subframes a and b and RBs c and d, which indicates that the subframes a and b and the RBs c and d are SL resources.

② At least one of identifiers of a start resource and an end resource

If both are included, for example, it indicates subframes a and b, which indicates that the subframes a and b are time domain SL resources; for example, it indicates RBs c and d, which indicates that the RBs c and d are frequency domain SL resources; or for example, it indicates subframes a and b and RBs c and d, which indicates that the subframes a and b and the RBs c and d are SL resources.

If only one is included, if the start point is included, resources from the start resource to the largest resource are SL resources; and if the end point is included, resources from the smallest resource to the end resource are SL resources.

The time domain resource and the frequency domain resource may be indicated by different parameters, or may be indicated by the same parameter. The non-SL resource and the SL resource may be indicated by the same set of parameters, or may be indicated by more than one set of parameters.

If the sidelink resource configuration information includes a bitmap and resource pattern identifiers, optionally, bits of the bitmap correspond to different resource groups, and the resource pattern identifiers correspond to pattern identifiers in the resource groups. Alternatively, bits of the bitmap correspond to resources in resource groups, and the resource pattern identifiers correspond to different resource groups.

If the sidelink resource configuration information includes resource identifiers and resource pattern identifiers, optionally, different resource identifiers correspond to different resource groups, and the resource pattern identifiers correspond to pattern identifiers in the resource groups. Alternatively, different resource identifiers correspond to different resources in resource groups, and the resource pattern identifiers correspond to different resource groups.

If the sidelink resource configuration information includes resource identifiers and a bitmap, optionally, bits of the bitmap correspond to different resource groups, and different resource identifiers correspond to different resources in the resource groups. Alternatively, bits of the bitmap correspond to resources in resource groups, and different resource identifiers correspond to different resource groups.

If the sidelink resource configuration information includes a bitmap, resource identifiers, and resource pattern identifiers, optionally, bits of the bitmap correspond to different resource groups, the resource pattern identifiers correspond to pattern identifiers in the resource groups, and the resource identifiers correspond to different resources in a pattern.

In Specific Embodiment 4, when the first signal carries first signal transmission information, the first signal transmission information includes at least one of the following:

(1) Information of a first signal that is actually transmitted, where the first signal indicated by the information is the first signal that is actually transmitted, and a form of the information may be at least one of the following:

Bitmap, for example, a first signal indicated by the bitmap is the first signal that is actually transmitted.

Alternatively, a quantity M. For example, first signals can only be transmitted according to a specific rule from a first signal having a fixed index. For example, M consecutive first signals are transmitted from an index 0.

Alternatively, start index+quantity M. In other words, consecutive M from a start index.

Alternatively, end index+quantity M. In other words, consecutive M from an end index.

(2) Information of a first signal that is allowed to be transmitted, where a form of the information may be at least one of the following:

For example, a maximum quantity N of first signals that are allowed to be transmitted.

For example, an index range of first signals that are allowed to be transmitted. For example, at least one of a maximum value and a minimum value of indexes of first signals that are allowed to be transmitted is included.

For example, a minimum index is included, and a quantity is N. In other words, consecutive N from the minimum index.

For example, a maximum index is included, and a quantity is N. In other words, consecutive N up to the maximum index.

For example, a maximum index and a minimum index are included. In other words, from the minimum index and up to the maximum index.

In Specific Embodiment 5, when the first signal carries beam transmission information, the beam transmission information includes at least one of the following:

(1) Information of a beam that is actually transmitted, where the beam indicated by the information is the beam that is actually transmitted, and a form of the information may be at least one of the following:

Bitmap, for example, a beam indicated by the bitmap is the beam that is actually transmitted.

Alternatively, a quantity M. For example, beams can only be transmitted according to a specific rule from a beam having a fixed index. For example, M consecutive beams are transmitted from an index 0.

Alternatively, start index+quantity M. In other words, consecutive M from a start index.

Alternatively, end index+quantity M. In other words, consecutive M from an end index.

(2) Information of a beam that is allowed to be transmitted

For example, a maximum quantity N of beams that are allowed to be transmitted.

For example, an index range of beams that are allowed to be transmitted. For example, at least one of a maximum value and a minimum value of indexes of beams that are allowed to be transmitted is included.

For example, a minimum index is included, and a quantity is N. In other words, consecutive N from the minimum index.

For example, a maximum index is included, and a quantity is N. In other words, consecutive N up to the maximum index.

For example, a maximum index and a minimum index are included. In other words, from the minimum index and up to the maximum index.

There may be a correspondence between a beam and a first signal, and the correspondence may be one-to-one, one-to-many, many-to-one, and many-to-many. For example, in some embodiments, one first signal corresponds to one beam, but directional information of the beam cannot be specifically reflected. In this case, different first signals may correspond to different beam identifiers, but may actually be transmitted through beams in the same direction.

For example, in some embodiments, one first signal corresponds to a group of beams, but directional information of the beams cannot be specifically reflected. In this case, different first signals may correspond to different beam identifiers, but may actually be transmitted through beams in the same group of directions.

For example, in some embodiments, one first signal may correspond to one beam and its directional information at the same time, and beams and beam directions between different signal blocks are different. In this case, beam identifiers corresponding to synchronization signal blocks that are transmitted in the same transmission direction are the same.

For example, in some embodiments, one first signal may correspond to a group of beams and their directional information at the same time, and beams and beam directions between different signal blocks are different. In this case, beam identifiers corresponding to synchronization signal blocks that are transmitted in the same group of transmission directions are the same.

The direction mentioned in this embodiment is a direction of beam transmission.

In Specific Embodiment 6, when the first signal carries at least one of information such as device identification information and a first signal identifier, and the first signal includes: a broadcast channel, a reference signal, a synchronization signal, and a measurement signal:

(1) The broadcast channel is used to carry at least some of the information carried by the first signal.

(2) Optionally, for the reference signal in the first signal.
  1. Optionally, for the reference signal in the first signal, a reference signal sequence is determined based on mapping of at least some of the information carried by the broadcast channel. For example, at least some of the information carried by the broadcast channel is mapped (for example, through a hash function) to one value or a group of values, and the reference signal sequence is generated based on a mapping result.
  2. Optionally, for the reference signal in the first signal, a reference signal sequence is determined based on mapping of at least some of the information carried by the broadcast channel. For example, at least some of the information carried by the broadcast channel is mapped (for example, through a hash function) to one value or a group of values, and a sequence is selected from candidate sequences based on a mapping result and is used as the reference signal sequence.
  3. Optionally, the at least some of the information in 1 and 2 includes at least one of the device identification information and the first signal identifier.
  4. Optionally, the at least some of the information in 1 and 2 includes all information carried by the broadcast channel.
  5. Randomly select from a candidate set.

Optionally, randomly select from a candidate sequence set (for example, UE randomly selects one from eight DMRS sequences).

Optionally, select based on a specific criteria (for example, a terminal selects based on a measurement and/or detection result). A specific implementation is that the terminal does not select a detected candidate sequence that has been used by another terminal; or excludes a candidate sequence whose detected measurement result is greater than a corresponding threshold, and selects from the remaining candidate sequences. If all candidate sequences are used by other terminals and/or a detected measurement result intensity is greater than the corresponding threshold, optionally, the terminal selects the candidate sequence whose measurement result intensity is the smallest, where a measurement scale may be at least one of an RSRP, a reference signal received quality (Reference Signal Received Quality, RSRQ), a received signal strength indicator (Received Signal Strength Indicator, RSSI), and a signal to interference plus noise ratio (Signal to Interference plus Noise Ratio, SINR).

(3) Optionally, for the measurement signal in the first signal.
  1. Optionally, a measurement signal sequence is generated based on at least some of the foregoing information that needs to be carried by the broadcast channel. Optionally, the at least some information includes at least one of device identification information and an identifier of a first signal. For example, the measurement signal sequence is generated based on the device identification information and the identifier of the first signal that are carried by the broadcast channel.
  2. Randomly select from a candidate set.

Optionally, randomly select from a candidate sequence set (for example, UE randomly selects one from eight DMRS sequences).

Optionally, select based on a specific criteria (for example, a terminal selects based on a measurement and/or detection result). A specific implementation is that the terminal does not select a detected candidate sequence that has been used by another terminal: or excludes a candidate sequence whose detected measurement result is greater than a corresponding threshold, and selects from the remaining candidate sequences. If all candidate sequences are used by other terminals and/or a detected measurement result intensity is greater than the corresponding threshold, optionally, the terminal selects the candidate sequence whose measurement result intensity is the smallest, where a measurement scale may be at least one of an RSRP, a reference signal received quality (Reference Signal Received Quality, RSRQ), a received signal strength indicator (Received Signal Strength Indication, RSSI), and a signal to interference plus noise ratio (Signal to Interference plus Noise Ratio, SINR).

(4) Optionally, the reference signal may be at least one of the following and the measurement signal may be at least one of the following:
  1. It may be at least one of a DMRS, a CSI-RS, a TRS, a PTRS, an SRS, an SSS, and a PSS.
  2. It may be at least one of another m sequence, another ZC sequence, and another gold sequence other than the foregoing reference sequence, or may be multiplication of at least two sequences. For example, sequences may be mapped into symbols to perform sequence multiplication.

Further, it may be a sequence whose generating method and sequence length are the same as that of an SSS.

Further, it may be a sequence whose generator polynomial and sequence ID are the same as that of an SSS but whose length is greater than 127.

Further, it may be a sequence whose generator polynomial is the same as that of a PSS but whose length is greater than 127.

Further, it may be a sequence whose generator polynomial is the same as that of a PSS but whose quantity of cyclic shifts is not limited to 3.

Further, it may be multiplication of a gold sequence and an m sequence.

A specific implementation is that a signal block includes a PSS (referred to as a PSSS on a sidelink), an SSS (referred to as an SSSS on a sidelink), a DMRS and a measurement reference signal (measurement reference signal, MRS). The reference signal is a DMRS. All information carried by a broadcast channel PBCH (referred to as a PSBCH on a sidelink) are mapped to obtain a value, and a DMRS sequence is initialized and generated based on the value. The information carried by the PBCH (PSBCH) includes an index of a first signal and an ID of a sending device (if it is sidelink transmission, it is an ID of UE), and an MRS sequence is initialized and generated based on the index and the ID. The terminal may measure the MRS signal to obtain a measurement result of the signal block sent by the sending device.

The MRS is an abbreviation provided for ease of description. In fact, there may be another name based on a type and a function.

The gold sequence is exclusive OR of two m sequences, and a length of an output gold sequence c(n) is M, where n=0.1, . . . , M−1:

$c(n) = (x_1(n+N_C) + x_2(n+N_C)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2.$ M is an integer, and an initialization sequence of at least one of $x_1$ and $x_2$ is indicated by Cinit.

A specific implementation is that assuming that a sending device ID carried in a broadcast channel is 10 bits, and an MRS is a gold sequence, in this case, the MRS may be initialized according to the following formula:

An initialization formula of the sequence is: $c_{init} = (2^a(i+l+1)(2n_{ID}+1) + n_{ID}) \mod 2^{31}$.

a is an integer, np is a 10 bit terminal ID, i is an identifier of a first signal, l is a number of an OFDM symbol in a slot, or l may also be 0, and a sequence c(n) is:

$c(n) = (x_1(n+N_C) + x_2(n+N_C)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2.$ A generating formula of the sequence is:

$$r(m) = \frac{1}{\sqrt{2}}(1 - 2 \cdot c(2m)) + j\frac{1}{\sqrt{2}}(1 - 2 \cdot c(2m+1)).$$

Another specific implementation is that assuming that a reference sequence is a gold sequence, in this case, the reference sequence may be initialized according to the following formula:

An initialization formula of the sequence is: $c_{init} = (2^a(i+l+1)(2n_{ID}+1) + n_{ID}) \mod 2^{31}$.

b is an integer, $BCH_{mapping}$ is a value obtained by mapping information carried by a broadcast channel, i is an identifier of a first signal, l is a number of an OFDM symbol in a slot, or l may also be 0, and a sequence c(n) is:

$c(n) = (x_1(n+N_C) + x_2(n+N_C)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2$ A generating formula of the sequence is:

$$r_l(m) = \frac{1}{\sqrt{2}}(1 - 2 \cdot c(2m)) + j\frac{1}{\sqrt{2}}(1 - 2 \cdot c(2m+1)).$$

Another specific implementation is that when a reference signal is an m sequence, a generator polynomial that is the same as that of a PSS is used, and a generating method is as follows:

$d_1(n) = 1 - 2x(m).$ $m = (n+N_{CS}) \mod L$ $0 \le n < L$

L is a length of the m sequence, and Ncs is a cyclic shift. Optionally, there is a mapping relationship between Ncs and a value obtained by mapping information carried by a broadcast channel. For example, a total of eight different values may be obtained by mapping the information carried by different broadcast channels, and each value corresponds to a different Ncs. For a first signal, a cyclic shift Ncs in a reference sequence of the first signal corresponds to a result obtained by mapping information carried by a broadcast channel of the first signal.

$x(i+7) = (x(i+4) + x(i)) \mod 2$ $[x(6)x(5)x(4)x(3)x(2)x(1)x(0)] = [1110110]$

Another specific implementation is that when a reference signal is an m sequence, a generator polynomial that is the same as that of an SSS is used:

$d(n) = [1 - 2x_0((n+m_0) \mod L)][1 - 2x_1((n+m_1) \mod L)]$ $m_0 = 15\left\lfloor \frac{N1}{112} \right\rfloor + 5N_2$ $m_1 = N_1 \mod 112$ L is a length of the m sequence, and at least one of $N_1$ and $N_2$ is obtained by mapping information carried by a broadcast channel.

$x_0(i+7) = (x_0(i+4) + x_0(i)) \mod 2$ $x_1(i+7) = (x_1(i+1) + x_1(i)) \mod 2$ $[x_0(6)x_0(5)x_0(4)x_0(3)x_0(2)x_0(1)x_0(0)] = [0000001]$ and $[x_1(6)x_1(5)x_1(4)x_1(3)x_1(2)x_1(1)x_1(0)] = [0000001]$.

Another specific implementation is that an MRS is multiplication of a Gold sequence and an m sequence (that is, mutual modulation). It is assumed that a length of the gold sequence c(n) is M, where n=0, 1, . . . , M−1, and a transmitted gold sequence is $d_1(n) = 1 - 2c(n)$.

A generating method of the m sequence is as follows:
$d_2(n)=1-2x(n+m) \mod M$), where m is a cyclic shift value.
A cyclic shift value may be configured for each UE or each group of UEs.

The transmitted MRS sequence is the multiplication of the foregoing Gold sequence and m sequence (that is, mutual modulation):

$$d(n)=d_1(n) \cdot d_2(n).$$

Another specific implementation is that a MRS is multiplication of three m sequences, and the three m sequences are respectively described as $d_1(n)$, $d_2(n)$, and $d_3(n)$ below:

A generating method of $d_1(n)$ is as follows:

$$d_1(n)=1-2x(m).$$

$$m=(n+N_{CS}) \mod L$$

$$0 \le n < L$$

$N_{cs}$ is a cyclic shift, and L is a sequence length.

$$x(i+7)=(x(i+4)+x(i)) \mod 2$$

$$[x(6)x(5)x(4)x(3)x(2)x(1)x(0)]=[1110110]$$

Generating methods of $d_2(n)$ and $d_3(n)$ are as follows:

$$d_2(n) = 1 - 2x_0((n + m_0) \mod L)$$

$$d_3(n) = 1 - 2x_1((n + m_1) \mod L)$$

$$m_0 = 3 \left\lfloor \frac{N_2}{112} \right\rfloor + N_2$$

$$m_1 = (N_1 \mod 112) + m_0 + 1$$

$$0 \le n < L \circ$$

A transmitted sequence d(n) is:

There is a mapping relationship between $N_{cs}$, $N_1$, $N_2$, a sending device identifier, and a first signal identifier. For example, the sending device identifier is assigned to X groups, $N_{cs}$ has X possible values in total, each $N_{cs}$ value corresponds to one sending device identifier group, one sending device identifier group corresponds to Y subgroups, $N_1$ has X possible values in total, each $N_1$ value corresponds to one sending device identifier subgroup, one sending device identifier subgroup corresponds to Z sending device identifiers, $N_2$ has Z possible values in total, and each $N_2$ value corresponds to one sending device identifier.

Another specific implementation is that an MRS includes two sequences, where a generating method of one sequence $d_1(n)$ is as follows:

$N_{cs}$ is a cyclic shift, and L is a sequence length.

$$x(i+7)=(x(i+4)+x(i)) \mod 2$$

$$[x(6)x(5)x(4)x(3)x(2)x(1)x(0)]=[1110110]$$

A generating method of the other sequence $d_2(n)$ is as follows:

$$d_2(n) = [1 - 2x_0((n + m_0) \mod L)][1 - 2x_1((n + m_1) \mod L)]$$

$$m_0 = 3 \left\lfloor \frac{N_2}{112} \right\rfloor + N_2$$

$$m_1 = (N_1 \mod 112) + m_0 + 1$$

$$0 \le n < L$$

There is a mapping relationship between $N_{cs}$, $N_1$, $N_2$, a sending device identifier, and a first signal identifier. For example, the sending device identifier is assigned to X groups, $N_{cs}$ has X possible values in total, each $N_{cs}$ value corresponds to one sending device identifier group, one sending device identifier group corresponds to Y subgroups, $N_1$ has X possible values in total, each $N_1$ value corresponds to one sending device identifier subgroup, one sending device identifier subgroup corresponds to Z sending device identifiers, $N_2$ has Z possible values in total, and each $N_2$ value corresponds to one sending device identifier.

Optionally, these two sequences may occupy two OFDM symbols.

Optionally, these two sequences are also used for a PSS (referred to as a PSSS on a sidelink) and an SSS (referred to as an SSSS on a sidelink) respectively, that is, the MRS includes the PSS and the SSS. In this case, $N_1$ and $N_2$ may be sequence IDs of the PSS and the SSS respectively.

In Specific Embodiment 7, when the first signal carries at least one of information such as device identification information and a first signal identifier, and the first signal at least includes: a reference signal and a data channel:

(1) The data channel is used to carry at least some of the information carried by the first signal.

(2) Optionally, for the reference signal in the first signal.

1. Optionally, a reference signal sequence is determined based on mapping of at least some of the information carried by the data channel. For example, at least some of the information carried by the data channel is mapped (for example, through a hash function) to one value or a group of values, and the reference signal sequence is generated based on a mapping result.

2. Optionally, for the reference signal in the first signal, a reference signal sequence is determined based on mapping of at least some of the information carried by the data channel. For example, at least some of the information carried by the data channel is mapped (for example, through a hash function) to one value or a group of values, and a sequence is selected from candidate sequences based on a mapping result and is used as the reference signal sequence.

3. Optionally, the at least some of the information in 1 and 2 includes at least one of the device identification information and the first signal identifier.

4. Optionally, the at least some of the information in 1 and 2 includes all information carried by the data channel.

5. Optionally, a measurement signal sequence is generated based on at least some of the foregoing information that needs to be carried by the data channel (for example, through a hash method). Optionally, the at least some information includes at least one of device identification information and an identifier of a first signal. For example, the measurement signal sequence is generated based on the device identification information and the identifier of the first signal that are carried by the data channel.

6. Randomly select from a candidate set.

Optionally, randomly select from a candidate sequence set (for example, UE randomly selects one from eight DMRS sequences).

Optionally, select based on a specific criteria (for example, a terminal selects based on a measurement and/or detection result). A specific implementation is that the terminal does not select a detected candidate sequence that has been used by another terminal: or excludes a candidate sequence whose detected measurement result is greater than a corresponding threshold, and selects from the remaining candidate sequences. If all candidate sequences are used by other terminals and/or a detected measurement result intensity is greater than the corresponding threshold, optionally, the terminal selects the candidate sequence whose measurement result intensity is the smallest, where a measurement scale may be at least one of an RSRP, a reference signal received quality (Reference Signal Received Quality, RSRQ), a received signal strength indicator (Received Signal Strength Indication, RSSI), and a signal to interference plus noise ratio (Signal to Interference plus Noise Ratio, SINR).

Optionally, the first signal also includes a random access signal.

For a generating formula of the reference signal in this embodiment, use the same generating formula of the reference signal or the measurement signal in Embodiment 6. Details are not described herein again. In this case, when the formula in Embodiment 6 is used, the information carried by the broadcast channel in the formula may be replaced with the information carried by the data channel and used to determine (generate) the reference signal.

In Specific Embodiment 8, first signal measurement information may be configured by at least one manner of a pre-definition of a protocol, a configuration of a network side device, a configuration of another terminal, and a pre-configuration of a manufacturer, so as to be used for at least one of BFD (beam failure detection), RLM, and RRM.

The first signal measurement information may include the following:

a frequency channel number:
an ID of a subordinate pool:
an identifier of a measured target:
a period of a measurement window:
a length of a measurement window; and
an indicator of a first signal to be measured, including at least one of the following: a bitmap, an identifier (one or more), a quantity of first signals to be measured, a quantity of first signals to be measured and an index of a first one among the first signals to be measured, and a quantity of first signals to be measured and an index of a last first signal to be measured.

A receiving device, for example, a terminal, uses the information to determine a resource to be measured. Optionally, an indicated resource is measured, and at least one of a PSS, an SSS, a reference signal, and a measurement signal is detected and measured, and evaluation is performed based on a measurement result to determine an evaluation result.

The terminal obtains an identifier 1 of a first signal and/or an identifier 2 of a beam from the indicated resource based on at least one of the detected PSS, SSS, physical broadcast channel, reference signal, and measurement signal. The terminal considers that the evaluation result corresponds to the first signal corresponding to the identifier 1 and/or the beam corresponding to the identifier 2.

When the first signal is used for a sidelink, an MRS may be used for at least one of RRM, RLM, BFD, power control, and BM on the sidelink.

A specific implementation is that a signal block includes a PSS (referred to as a PSSS on a sidelink), an SSS (referred to as an SSSS on a sidelink), a reference signal, and a measurement signal MRS. The terminal measures the MRS signal on a corresponding information structure based on indication of measurement information, and evaluates based on a measurement result. For example, the measurement result is compared with at least one of a corresponding determining threshold and/or criterion and the like, so as to determine subsequent steps.

For example, to perform the RRM measurement based on the MRS, the terminal may compare at least one measurement scale of RSRPs, RSSIs, RSRQs, and SINRs of different first signals MRSs, and select one or more first signals, for example, select one or more first signals whose measurement scale results are the highest or select one or more first signals whose measurement scale results meet threshold requirements.

For example, to perform the RLM measurement based on the MRS, the terminal may evaluate at least one of quality and/or status of a current link through the measured first signal MRS, optionally further determine whether IS or OOS needs to be reported, and optionally further determine whether a link recovery request needs to be initiated.

For example, to perform the BFD measurement based on the MRS, the terminal may evaluate at least one of quality and/or status of a beam, for example, whether a beam failure occurs, and optionally further determine whether a beam recovery request needs to be initiated.

For example, to perform the power control based on the MRS, the terminal may use a measured received power of the first signal MRS to send indication information based on the received power and assist a sender in adjusting a signal power.

For example, to perform the BM measurement based on the MRS, the terminal may use at least one measurement scale of an RSRP, an RSSI, an RSRQ, and an SINR of the first signal MRS to evaluate at least one of beam quality, status, and/or QCL information corresponding to the first signal, and optionally further select a beam or beams to be transmitted and received, for example, select a beam corresponding to a first signal whose measurement scale result is the highest or select beams corresponding to one or more first signals whose measurement scale results meet threshold requirements.

Optionally, a type of the reference signal is a DMRS, and a DMRS sequence is initialized and generated based on a value obtained by mapping information carried by a broadcast channel. The information carried by the broadcast channel includes an index of a first signal and an ID of a sending device, and an MRS sequence is initialized and generated based on the index and the ID.

In Specific Embodiment 9, the first signal may provide a QCL reference of quasi co-location (Quasi-co-location, QCL) parameter for transmission of another signal. In other words, there may be an association relationship between the first signal and the another signal.

The association relationship may be a pre-definition of a protocol, a configuration of a network side device, a configuration of another terminal, and/or a pre-configuration of a manufacturer.

When a plurality of first signals are configured for the same another signal and/or resource pool and may be used as QCL references, high-layer signaling, a MAC-CE (Media Access Control-Control Element), or downlink control information may be used to indicate that one of the first signals is used as an actual QCL reference.

A case in which the association relationship is the pre-definition of the protocol or the pre-configuration of the manufacturer is that another signal and/or resource pool performs resource mapping based on a first signal identifier and according to a specific rule. The rule includes at least one of the following:

For example, mapping in ascending order in time domain.

For example, mapping in ascending order in frequency domain.

For example, first mapping in frequency domain and then mapping in time domain.

Figure 6:
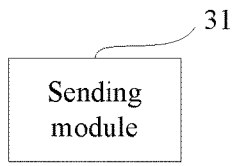
FIG. 6 is a structural block diagram of a sending device according to an embodiment of the present disclosure.

An embodiment of the present disclosure further provides a sending device. As shown in FIG. 6, the sending device includes:

a sending module 31, configured to send a first signal to a receiving device, where the first signal includes at least one of the following information:
timing information:
device identification information:
group identification information:
resource configuration information;
first signal transmission information;
beam transmission information; and
other information.

In this embodiment, a sending device sends a first signal to a receiving device, where the first signal includes at least one of the following information: timing information; device identification information; group identification information; resource configuration information; first signal transmission information; beam transmission information; and other information. Through the technical solution of the present disclosure, the receiving device may determine information about the sending device by detecting the first signal, which facilitates subsequent operations such as measurement, merging, decoding, and management, and improves transmission accuracy.

Further, the sending device further includes:
a determining module, configured to determine at least one of the following based on at least some of the information included in the first signal:
a sequence of a reference signal;
a sequence of a synchronization signal;
a sequence of a measurement signal; and
a sequence of a random access signal.

Further, the first signal includes at least one of the following:
a broadcast channel, a reference signal, a synchronization signal, a measurement signal, a random access signal, and a data channel.

Further, the broadcast channel carries the at least some of the information included in the first signal; and/or
the data channel carries the at least some of the information included in the first signal.

Further, the determining module is specifically configured to: determine at least one of the following based on the at least some of the information carried in the broadcast channel: the sequence of the reference signal, the sequence of the synchronization signal, and the sequence of the measurement signal; and/or
determine at least one of the following based on the at least some of the information carried in the data channel: the sequence of the reference signal, and the sequence of the random access signal.

Further, the determining module is specifically configured to perform at least one of the following:
determining, based on the at least some of the information carried in the broadcast channel and a corresponding mapping, the sequence of the reference signal, the synchronization signal, and/or the measurement signal;
determining, based on the at least some of the information carried in the broadcast channel and a corresponding mapping, a plurality of candidate sequences of the reference signal, the synchronization signal, and/or the measurement signal, and selecting one sequence of the reference signal, the synchronization signal, and/or the measurement signal from the plurality of candidate sequences of the reference signal, the synchronization signal, and/or the measurement signal;
generating, based on the at least some of the information carried in the broadcast channel, the sequence of the reference signal, the synchronization signal, and/or the measurement signal; and selecting, based on the at least some of the information carried in the broadcast channel, one sequence of the reference signal, the synchronization signal, and/or the measurement signal from a plurality of candidate sequences of the reference signal, the synchronization signal, and/or the measurement signal.

Further, the determining module is specifically configured to perform at least one of the following:
determining, based on the at least some of the information carried in the data channel and a corresponding mapping, the sequence of the reference signal and/or the random access signal;
determining, based on the at least some of the information carried in the data channel and a corresponding mapping, a plurality of candidate sequences of the reference signal and/or the random access signal, and selecting one sequence of the reference signal and/or the random access signal from the plurality of candidate sequences of the reference signal and/or the random access signal;
generating, based on the at least some of the information carried in the data channel, the sequence of the reference signal and/or the random access signal; and
selecting, based on the at least some of the information carried in the data channel, one sequence of the reference signal and/or the random access signal from the plurality of candidate sequences of the reference signal and/or the random access signal.

Further, the at least some of the information included in the first signal includes at least one of the following:
device identification information, and an identifier of the first signal.

Further, the timing information includes at least one of the following:
frame information, slot information, an identifier of the first signal, an identifier of a transmission direction, and an identifier of a resource set to which the first signal belongs.

Further, the resource set is at least one of the following:
time domain resources occupied by N first signals;
frequency domain resources occupied by N first signals;
a frequency domain range to which N first signals belong; and
a time range to which N first signals belong, where
N is a positive integer.

Further, the resource configuration information includes at least one of the following:
uplink and downlink resource configuration information; and
sidelink resource configuration information.

Further, the uplink and downlink resource configuration information is obtained in at least one of the following manners:
obtained through configuration from a network side device;

obtained through pre-configuration; and
obtained implicitly through a resource pool.

Further, the sidelink resource configuration information indicates at least one of the following: a sidelink resource part and a non-sidelink resource part.

Further, the sidelink resource configuration information is at least one of the following forms:
a bitmap;
a resource pattern identifier; and
a resource identifier.

Further, the first signal transmission information includes at least one of the following:
information of a first signal that is actually transmitted; and
information of a first signal that is allowed to be transmitted.

Further, the beam transmission information includes at least one of the following:
information of a beam that is allowed to be transmitted;
information of a beam that is actually transmitted; and
information of a beam corresponding to the current first signal.

Further, the other information includes at least one of the following:
power information; and
subsequent communication information.

Further, the subsequent communication information includes at least one of the following:
configuration information of subsequent communication; and
a mapping relationship between the first signal and a resource of a resource pool.

Further, the first signal is used to perform at least one of the following:
synchronization;
measurement;
power control;
directional information providing; and
directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

Figure 7:
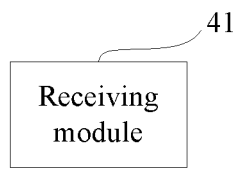
FIG. 7 is a structural block diagram of a receiving device according to an embodiment of the present disclosure.

An embodiment of the present disclosure further provides a receiving device. As shown in FIG. 7, the receiving device includes:
a receiving module 41, configured to receive a first signal from a sending device, where the first signal includes at least one of the following information:
timing information;
device identification information;
group identification information;
resource configuration information;
first signal transmission information;
beam transmission information; and
other information.

In this embodiment, a sending device sends a first signal to a receiving device, where the first signal includes at least one of the following information: timing information; device identification information; group identification information; resource configuration information; first signal transmission information; beam transmission information; and other information. Through the technical solution of the present disclosure, the receiving device may determine information about the sending device by detecting the first signal, which facilitates subsequent operations such as measurement, merging, decoding, and management, and improves transmission accuracy.

Further, the first signal includes at least one of the following:
a broadcast channel, a reference signal, a synchronization signal, a measurement signal, a random access signal, and a data channel.

Further, the broadcast channel carries the at least some of the information included in the first signal; and/or
the data channel carries the at least some of the information included in the first signal.

Further, the at least some of the information included in the first signal includes at least one of the following:
device identification information, and an identifier of the first signal.

Further, the timing information includes at least one of the following:
frame information, slot information, an identifier of the first signal, an identifier of a transmission direction, and an identifier of a resource set to which the first signal belongs.

Further, the resource set is at least one of the following:
time domain resources occupied by N first signals;
frequency domain resources occupied by N first signals;
a frequency domain range to which N first signals belong; and
a time range to which N first signals belong, where
N is a positive integer.

Further, the resource configuration information includes at least one of the following: uplink and downlink resource configuration information; and sidelink resource configuration information.

Further, the sidelink resource configuration information indicates at least one of the following: a sidelink resource part and a non-sidelink resource part.

Further, the sidelink resource configuration information is at least one of the following forms:
a bitmap;
a resource pattern identifier; and
a resource identifier.

Further, the first signal transmission information includes at least one of the following:
information of a first signal that is actually transmitted; and
information of a first signal that is allowed to be transmitted.

Further, the beam transmission information includes at least one of the following:
information of a beam that is allowed to be transmitted;
information of a beam that is actually transmitted; and
information of a beam corresponding to the current first signal.

Further, the other information includes at least one of the following:
power information; and
subsequent communication information.

Further, the subsequent communication information includes at least one of the following:
configuration information of subsequent communication; and
a mapping relationship between the first signal and a resource of a resource pool.

Further, the receiving device further includes:
a processing module, configured to utilize the first signal to perform at least one of the following:
synchronization;
measurement;
power control;
directional information providing; and
directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

An embodiment of the present disclosure further provides a sending device, which can implement details of the signal sending method in the foregoing embodiment, and achieve the same effects. The sending device may be a network side device or a terminal.

Figure 8:
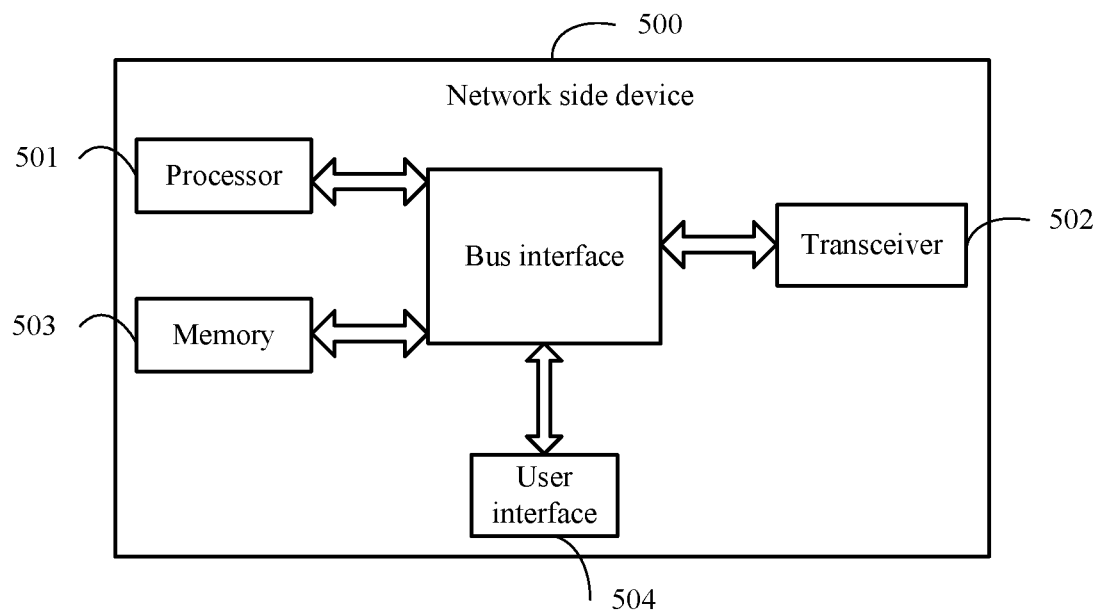
FIG. 8 is a schematic diagram of composition of a network side device according to an embodiment of the present disclosure.

When the sending device is the network side device, as shown in FIG. 8, the network side device 500 includes: a processor 501, a transceiver 502, a memory 503, a user interface 504, and a bus interface.

In this embodiment of the present disclosure, the network side device 500 further includes a computer program that is stored in the memory 503 and that can run on the processor 501. When the computer program is executed by the processor 501, the following step is implemented: sending a first signal to a receiving device, where the first signal includes at least one of the following information: timing information; device identification information; group identification information; resource configuration information; first signal transmission information; beam transmission information: and other information.

In FIG. 8, the bus architecture may include any quantity of interconnected buses and bridges, which are specifically connected together by various circuits of one or more processors represented by the processor 501 and a memory represented by the memory 503. The bus architecture may further connect together various other circuits of a peripheral device, a voltage stabilizer, a power management circuit, and the like, which are known in this art and will not be further described herein. The bus interface provides an interface. The transceiver 502 may include a plurality of elements, that is, include a transmitter and a receiver, and provide units for communication with various other apparatuses on a transmission medium. For different terminals, the user interface 504 may alternatively be an interface for externally or internally connecting a required device. The connected device includes but is not limited to a keypad, a display, a speaker, a microphone, a joystick, or the like.

The processor 501 is responsible for management of the bus architecture and general processing. The memory 503 may store data used by the processor 501 when operations are performed.

Further, when the computer program is executed by the processor 501, the following step is further performed:
determining at least one of the following based on at least some of the information included in the first signal;
a sequence of a reference signal;
a sequence of a synchronization signal;
a sequence of a measurement signal; and
a sequence of a random access signal.

Further, the first signal includes at least one of the following:
a broadcast channel, a reference signal, a synchronization signal, a measurement signal, a random access signal, and a data channel.

Further, the broadcast channel carries the at least some of the information included in the first signal; and/or
the data channel carries the at least some of the information included in the first signal.

Further, when the computer program is executed by the processor 501, at least one of the following is further performed: determining at least one of the following based on the at least some of the information carried in the broadcast channel: the sequence of the reference signal, the sequence of the synchronization signal, and the sequence of the measurement signal; and/or
determining at least one of the following based on the at least some of the information carried in the data channel: the sequence of the reference signal, and the sequence of the random access signal.

Further, when the computer program is executed by the processor 501, at least one of the following is further performed:
determining, based on the at least some of the information carried in the broadcast channel and a corresponding mapping, the sequence of the reference signal, the synchronization signal, and/or the measurement signal;
determining, based on the at least some of the information carried in the broadcast channel and a corresponding mapping, a plurality of candidate sequences of the reference signal, the synchronization signal, and/or the measurement signal, and selecting one sequence of the reference signal, the synchronization signal, and/or the measurement signal from the plurality of candidate sequences of the reference signal, the synchronization signal, and/or the measurement signal;
generating, based on the at least some of the information carried in the broadcast channel, the sequence of the reference signal, the synchronization signal, and/or the measurement signal; and
selecting, based on the at least some of the information carried in the broadcast channel, one sequence of the reference signal, the synchronization signal, and/or the measurement signal from a plurality of candidate sequences of the reference signal, the synchronization signal, and/or the measurement signal.

Further, when the computer program is executed by the processor 501, at least one of the following is further performed:
determining, based on the at least some of the information carried in the data channel and a corresponding mapping, the sequence of the reference signal and/or the random access signal;
determining, based on the at least some of the information carried in the data channel and a corresponding mapping, a plurality of candidate sequences of the reference signal and/or the random access signal, and selecting one sequence of the reference signal and/or the random access signal from the plurality of candidate sequences of the reference signal and/or the random access signal;
generating, based on the at least some of the information carried in the data channel, the sequence of the reference signal and/or the random access signal; and
selecting, based on the at least some of the information carried in the data channel, one sequence of the reference signal and/or the random access signal from the plurality of candidate sequences of the reference signal and/or the random access signal.

Further, the at least some of the information included in the first signal includes at least one of the following:
  device identification information, and an identifier of the first signal.

Further, the timing information includes at least one of the following:
  frame information, slot information, an identifier of the first signal, an identifier of a transmission direction, and an identifier of a resource set to which the first signal belongs.

Further, the resource set is at least one of the following:
  time domain resources occupied by N first signals;
  frequency domain resources occupied by N first signals;
  a frequency domain range to which N first signals belong; and
  a time range to which N first signals belong, where N is a positive integer.

Further, the resource configuration information includes at least one of the following: uplink and downlink resource configuration information; and sidelink resource configuration information.

Further, the uplink and downlink resource configuration information is obtained in at least one of the following manners:
  obtained through configuration from a network side device;
  obtained through pre-configuration; and
  obtained implicitly through a resource pool.

Further, the sidelink resource configuration information indicates at least one of the following: a sidelink resource part and a non-sidelink resource part.

Further, the sidelink resource configuration information is at least one of the following forms:
  a bitmap;
  a resource pattern identifier; and
  a resource identifier.

Further, the first signal transmission information includes at least one of the following:
  information of a first signal that is actually transmitted; and
  information of a first signal that is allowed to be transmitted.

Further, the beam transmission information includes at least one of the following:
  information of a beam that is allowed to be transmitted;
  information of a beam that is actually transmitted; and
  information of a beam corresponding to the current first signal.

Further, the other information includes at least one of the following:
  power information; and
  subsequent communication information.

Further, the subsequent communication information includes at least one of the following: configuration information of subsequent communication; and
  a mapping relationship between the first signal and a resource of a resource pool.

Further, the first signal is used to perform at least one of the following:
  synchronization;
  measurement;
  power control;
  directional information providing; and
  directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

Figure 9:
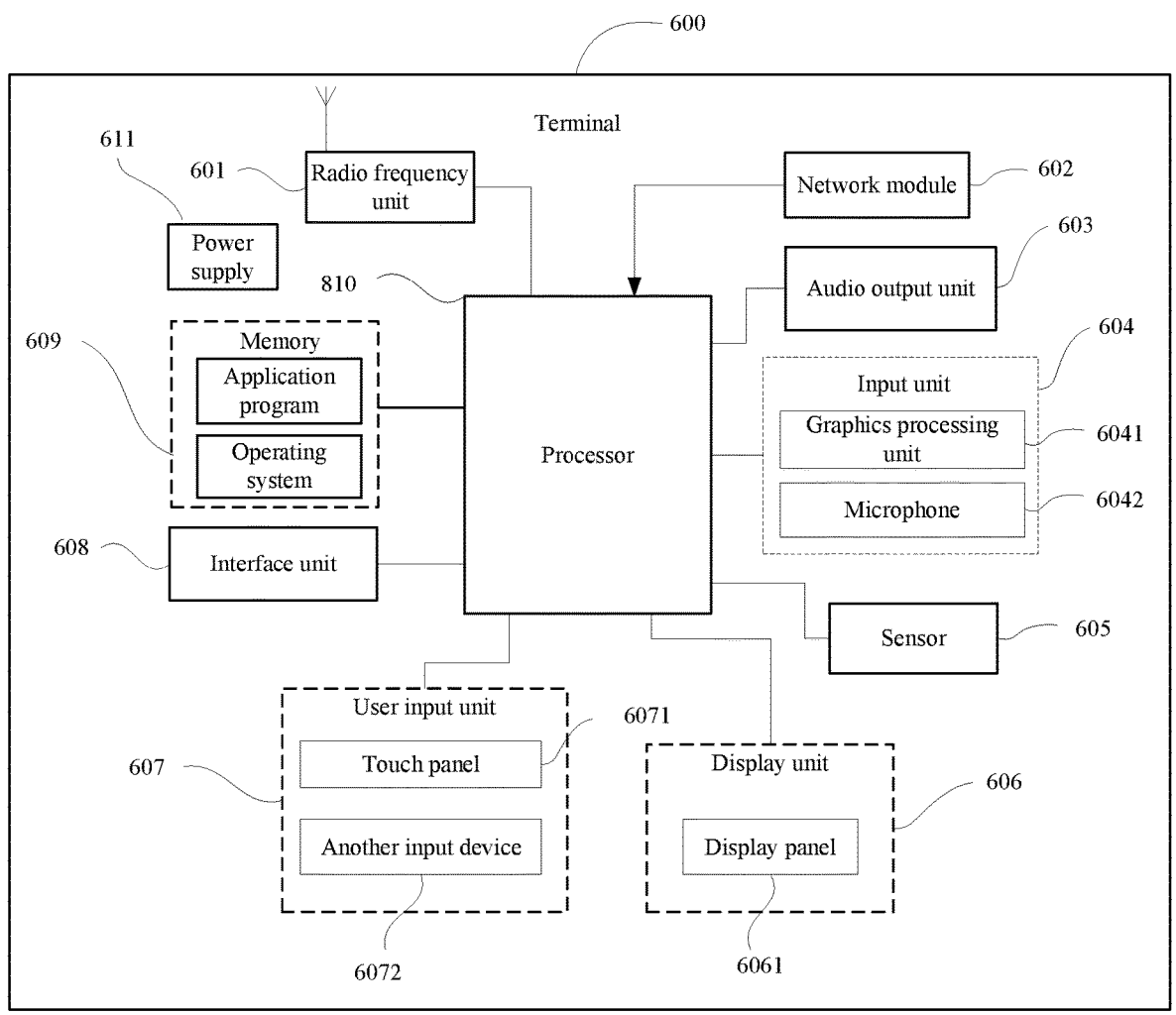
FIG. 9 is a schematic diagram showing a composition of a terminal according to an embodiment of the present disclosure.

When the sending device is the terminal, as shown in FIG. 9, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 9 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to send a first signal to a receiving device, where the first signal includes at least one of the following information: timing information; device identification information; group identification information; resource configuration information; first signal transmission information; beam transmission information: and other information.

Further, the processor 610 is further configured to determine at least one of the following based on at least some of the information included in the first signal;
  a sequence of a reference signal;
  a sequence of a synchronization signal;
  a sequence of a measurement signal; and
  a sequence of a random access signal.

Further, the first signal includes at least one of the following:
  a broadcast channel, a reference signal, a synchronization signal, a measurement signal, a random access signal, and a data channel.

Further, the broadcast channel carries the at least some of the information included in the first signal; and/or the data channel carries the at least some of the information included in the first signal.

Further, the processor 610 is further configured to determine at least one of the following based on the at least some of the information carried in the broadcast channel: the sequence of the reference signal, the sequence of the synchronization signal, and the sequence of the measurement signal; and/or
  determine at least one of the following based on the at least some of the information carried in the data channel: the sequence of the reference signal, and the sequence of the random access signal.

Further, the processor 610 is further configured to perform at least one of the following:
  determining, based on the at least some of the information carried in the broadcast channel and a corresponding mapping, the sequence of the reference signal, the synchronization signal, and/or the measurement signal;
  determining, based on the at least some of the information carried in the broadcast channel and a corresponding mapping, a plurality of candidate sequences of the reference signal, the synchronization signal, and/or the measurement signal, and selecting one sequence of the reference signal, the synchronization signal, and/or the measurement signal from the plurality of candidate sequences of the reference signal, the synchronization signal, and/or the measurement signal;

generating, based on the at least some of the information carried in the broadcast channel, the sequence of the reference signal, the synchronization signal, and/or the measurement signal; and selecting, based on the at least some of the information carried in the broadcast channel, one sequence of the reference signal, the synchronization signal, and/or the measurement signal from a plurality of candidate sequences of the reference signal, the synchronization signal, and/or the measurement signal.

Further, the processor 610 is further configured to perform at least one of the following:

determining, based on the at least some of the information carried in the data channel and a corresponding mapping, the sequence of the reference signal and/or the random access signal;

determining, based on the at least some of the information carried in the data channel and a corresponding mapping, a plurality of candidate sequences of the reference signal and/or the random access signal, and selecting one sequence of the reference signal and/or the random access signal from the plurality of candidate sequences of the reference signal and/or the random access signal;

generating, based on the at least some of the information carried in the data channel, the sequence of the reference signal and/or the random access signal; and selecting, based on the at least some of the information carried in the data channel, one sequence of the reference signal and/or the random access signal from the plurality of candidate sequences of the reference signal and/or the random access signal.

Further, the at least some of the information included in the first signal includes at least one of the following:

device identification information, and an identifier of the first signal.

Further, the timing information includes at least one of the following:

frame information, slot information, an identifier of the first signal, an identifier of a transmission direction, and an identifier of a resource set to which the first signal belongs.

Further, the resource set is at least one of the following:
time domain resources occupied by N first signals;
frequency domain resources occupied by N first signals;
a frequency domain range to which N first signals belong; and
a time range to which N first signals belong, where N is a positive integer.

Further, the resource configuration information includes at least one of the following:
uplink and downlink resource configuration information; and
sidelink resource configuration information.

Further, the uplink and downlink resource configuration information is obtained in at least one of the following manners:
obtained through configuration from a network side device;
obtained through pre-configuration; and
obtained implicitly through a resource pool.

Further, the sidelink resource configuration information indicates at least one of the following: a sidelink resource part and a non-sidelink resource part.

Further, the sidelink resource configuration information is at least one of the following forms:
a bitmap;
a resource pattern identifier; and
a resource identifier.

Further, the first signal transmission information includes at least one of the following: information of a first signal that is actually transmitted; and information of a first signal that is allowed to be transmitted.

Further, the beam transmission information includes at least one of the following:
information of a beam that is allowed to be transmitted;
information of a beam that is actually transmitted; and
information of a beam corresponding to the current first signal.

Further, the other information includes at least one of the following:
power information; and
subsequent communication information.

Further, the subsequent communication information includes at least one of the following:
configuration information of subsequent communication; and
a mapping relationship between the first signal and a resource of a resource pool.

Further, the first signal is used to perform at least one of the following:
synchronization;
measurement:
power control:
directional information providing: and
directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

It should be understood that in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing: and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with another device through a wireless communications system and network.

The terminal provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a receiver, and the like.

The input unit 604 is configured to receive an audio signal or a video signal. The input unit 604 may include a graphics processing unit (Graphics Processing Unit, GPU) 6041 and a microphone 6042. The graphics processing unit 6041 is configured to process image data of a static picture or a video obtained by an image capture apparatus (for example, a camera) in video capture mode or image capture mode. A processed image frame may be displayed on the display unit 606. The image frame processed by the graphics processing unit 6041 may be stored in the memory 609 (or another storage medium) or sent via the radio frequency unit 601 or the network module 602. The microphone 6042 may receive sound and can process such sound into audio data. Processed audio data may be converted, in telephone call mode, into a format that may be sent to a mobile communication base station via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor may adjust brightness of the display panel 6061 based on brightness of ambient light, and the proximity sensor may turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as horizontal and vertical screen switch, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information input by the user or information provided to the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input numeric or character information, and generate key signal inputs related to user settings and function control of the terminal. Specifically, the user input unit 607 includes a touch panel 6071 and another input device 6072. The touch panel 6071, also called a touch screen, may collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 may be implemented in various types such as resistive, capacitive, infrared, and surface acoustic wave. In addition to the touch panel 6071, the user input unit 607 may further include the another input device 6072. Specifically, the another input device 6072 may include but is not limited to a physical keyboard, function keys (such as a volume control key and a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 9, the touch panel 6071 and the display panel 6061 are configured as two independent components to implement input and output functions of the terminal, in some embodiments, the touch panel 6071 and the display panel 6061 may be integrated to implement the input and output functions of the terminal. Details are not limited herein.

The interface unit 608 is an interface for connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 608 may be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules not shown. Details are not described herein.

An embodiment of the present disclosure further provides a terminal, which can implement details of the signal receiving method in the foregoing embodiment, and achieve the same effects.

As shown in FIG. 9, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 9 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to receive a first signal from a sending device, where the first signal includes at least one of the following information:
 timing information;
 device identification information;
 group identification information;
 resource configuration information;
 first signal transmission information;
 beam transmission information; and
 other information.

Further, the processor 610 is further configured to monitor a first resource pool according to a corresponding procedure.

Further, the first signal includes at least one of the following:
 a broadcast channel, a reference signal, a synchronization signal, a measurement signal, a random access signal, and a data channel.

Further, the broadcast channel carries the at least some of the information included in the first signal; and/or
 the data channel carries the at least some of the information included in the first signal.

Further, the at least some of the information included in the first signal includes at least one of the following:
 device identification information, and an identifier of the first signal.

Further, the timing information includes at least one of the following:
 frame information, slot information, an identifier of the first signal, an identifier of a transmission direction, and an identifier of a resource set to which the first signal belongs.

Further, the resource set is at least one of the following:
 time domain resources occupied by N first signals;
 frequency domain resources occupied by N first signals;
 a frequency domain range to which N first signals belong; and
 a time range to which N first signals belong, where N is a positive integer.

Further, the resource configuration information includes at least one of the following: uplink and downlink resource configuration information; and sidelink resource configuration information.

Further, the sidelink resource configuration information indicates at least one of the following: a sidelink resource part and a non-sidelink resource part.

Further, the sidelink resource configuration information is at least one of the following forms:
 a bitmap;
 a resource pattern identifier; and
 a resource identifier.

Further, the first signal transmission information includes at least one of the following:
 information of a first signal that is actually transmitted; and
 information of a first signal that is allowed to be transmitted.

Further, the beam transmission information includes at least one of the following:
 information of a beam that is allowed to be transmitted;
 information of a beam that is actually transmitted; and
 information of a beam corresponding to the current first signal.

Further, the other information includes at least one of the following:
 power information; and
 subsequent communication information.

Further, the subsequent communication information includes at least one of the following: configuration information of subsequent communication; and
 a mapping relationship between the first signal and a resource of a resource pool.

Further, the processor 610 is further configured to utilize the first signal to perform at least one of the following:
 synchronization;
 measurement;
 power control;
 directional information providing; and
 directional information obtaining.

Further, when the receiving device is a sidelink terminal, measured information is used for at least one of beam failure detection BFD, radio link monitoring RLM, radio resource management RRM, CSI obtaining, and beam management.

Further, the directional information includes a quasi co-location relationship.

It should be understood that in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with another device through a wireless communications system and network.

The terminal provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a receiver, and the like.

The input unit 604 is configured to receive an audio signal or a video signal. The input unit 604 may include a graphics processing unit (Graphics Processing Unit, GPU) 6041 and a microphone 6042. The graphics processing unit 6041 is configured to process image data of a static picture or a video obtained by an image capture apparatus (for example, a camera) in video capture mode or image capture mode. A processed image frame may be displayed on the display unit 606. The image frame processed by the graphics processing unit 6041 may be stored in the memory 609 (or another storage medium) or sent via the radio frequency unit 601 or the network module 602. The microphone 6042 may receive sound and can process such sound into audio data. Processed audio data may be converted, in telephone call mode, into a format that may be sent to a mobile communication base station via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor may adjust brightness of the display panel 6061 based on brightness of ambient light, and the proximity sensor may turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as horizontal and vertical screen switch, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information input by the user or information provided to the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input numeric or character information, and generate key signal inputs related to user settings and function control of the terminal. Specifically, the user input unit 607 includes a touch panel 6071 and another input device 6072. The touch panel 6071, also called a touch screen, may collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 may be implemented in various types such as resistive, capacitive, infrared, and surface acoustic wave. In addition to the touch panel 6071, the user input unit 607 may further include the another input device 6072. Specifically, the another input device 6072 may include but is not limited to a physical keyboard, function keys (such as a volume control key and a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 9, the touch panel 6071 and the display panel 6061 are configured as two independent components to implement input and output functions of the terminal, in some embodiments, the touch panel 6071 and the display panel 6061 may be integrated to implement the input and output functions of the terminal. Details are not limited herein.

The interface unit 608 is an interface for connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 608 may be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules not shown. Details are not described herein.

An embodiment of the present disclosure further provides a computer readable storage medium, where the computer readable storage medium stores a computer program, and when the computer program is executed by a processor, steps in the foregoing signal sending method are implemented, or steps in the foregoing signal receiving method are implemented.

It may be understood that those embodiments described in this specification may be implemented by hardware, software, firmware, middleware, microcode, or a combination thereof. For implementation by hardware, the processing unit may be implemented in one or more application specific integrated circuits (Application Specific Integrated Circuit, ASIC), a digital signal processor (Digital Signal Processor, DSP), a digital signal processing device (DSP Device, DSPD), a programmable logic device (Programmable Logic Device, PLD), a field-programmable gate array (Field-Programmable Gate Array, FPGA), a general-purpose processor, a controller, a microcontroller, a microprocessor, another electronic unit for implementing the functions of this application, or a combination thereof.

For implementation by software, technologies described in this specification may be implemented by executing function modules (for example, a process and a function) in this specification. Software codes may be stored in the memory and executed by the processor. The memory may be implemented inside or outside the processor.

The embodiments in this specification are described in a progressive manner. Each embodiment focuses on a difference from another embodiment. For a same or similar part of the embodiments, refer to each other.

A person skilled in the art shall understand that the embodiments of the present disclosure may be provided as methods, apparatuses, or computer program products. Therefore, the embodiments of the present disclosure may be complete hardware embodiments, complete software embodiments, or software-hardware combined embodiments. In addition, the embodiments of the present disclosure may be used in a form of a computer program product implemented on one or more computer-usable storage media (including but not limited to a disk memory, a CD-ROM, an optical memory, and the like) including computer-usable program code.

The embodiments of the present disclosure are described with reference to a flowchart and/or a block diagram of the method, the terminal (system), and the computer program product according to the embodiments of the present disclosure. It should be understood that each procedure and/or block in the flowchart and/or the block diagram as well as a combination of procedures and/or blocks in the flowchart and/or the block diagram may be implemented by computer program instructions. Those computer program instructions may be provided to a general-purpose computer, a special-purpose computer, an embedded processor, or a processor of another programmable data processing terminal to generate a machine, so that an apparatus configured to implement functions specified in one or more procedures of a flowchart and/or one or more blocks of a block diagram is generated by using the instructions executed by the computer or the processor of the another programmable data processing terminal.

Those computer program instructions may also be stored in a computer readable memory that may guide a computer or another programmable data processing terminal to work in a specific manner, so that the instructions stored in the computer readable memory generate a product including an instruction apparatus. The instruction apparatus implements functions specified in one or more procedures of a flowchart and/or one or more blocks of a block diagram.

Those computer program instructions may also be loaded into a computer or another programmable data processing terminal, so that a series of operation steps are executed on the computer or the another programmable terminal to generate processing implemented by the computer, and the instruction executed on the computer or the another programmable terminal provide steps of functions specified in one or more procedures of a flowchart and/or one or more blocks of a block diagram.

Although some preferred embodiments of the present disclosure have been described, persons skilled in the art may make changes and modifications to these embodiments once they learn the basic inventive concept. Therefore, the following claims are intended to be construed as to cover the preferred embodiments and all changes and modifications falling within the scope of the present disclosure.

It should also be noted that in this specification, relational terms such as first and second are used only to differentiate an entity or operation from another entity or operation, and do not require or imply that any actual relationship or sequence exists between these entities or operations. In addition, the terms "comprise", "include", and any other variants thereof are intended to cover non-exclusive inclusion, so that a process, a method, an article, or a terminal that includes a series of elements not only includes these very elements, but may also include other elements not expressly listed, or also include elements inherent to this process, method, article, or terminal. Without being subject to further limitations, an element defined by a phrase "including a . . . " does not exclude presence of other identical elements in the process, method, article, or terminal that includes the very element.

The optional implementations of the present disclosure are described above. It should be noted that a person of ordinary skill in the art may further make some improvements and refinements without departing from the principles described in the present disclosure and these improvements and refinements shall also fall within the protection scope of the present disclosure.

What is claimed is:

1. A signal sending method performed by a sending device, comprising:
    sending a first signal to a receiving device on a broadcast channel, wherein the first signal comprises the following information:
        timing information; and
        resource configuration information;
    wherein the timing information comprises frame information and slot information, the frame information comprises direct frame number (DFN) information, and the slot information comprises a slot index; and
    wherein the resource configuration information comprises:
        uplink and downlink resource configuration information indicating uplink format information within a period of time, downlink format information within the period of time, and/or feasible format information within the period of time; and
        sidelink resource configuration information indicating a sidelink resource part.

2. The signal sending method according to claim 1, further comprising:
    determining at least one of the following based on at least some of the information comprised in the first signal;
    a sequence of a reference signal;
    a sequence of a synchronization signal;
    a sequence of a measurement signal; or
    a sequence of a random access signal.

3. The signal sending method according to claim 2, wherein the broadcast channel carries the at least some of the information comprised in the first signal; or
    a data channel carries the at least some of the information comprised in the first signal.

4. The signal sending method according to claim 3, further comprising at least one of the following:
  determining, based on the at least some of the information carried in the broadcast channel and a first corresponding mapping, the sequence of the reference signal, the sequence of the synchronization signal, or the sequence of the measurement signal;
  determining, based on the at least some of the information carried in the broadcast channel and a second corresponding mapping, a plurality of candidate sequences of the reference signal, a plurality of candidate sequences of the synchronization signal, or a plurality of candidate sequences of the measurement signal, and selecting the sequence of the reference signal, the sequence of the synchronization signal, or the sequence of the measurement signal from the plurality of candidate sequences of the reference signal, the plurality of candidate sequences of the synchronization signal, or the plurality of candidate sequences of the measurement signal, respectively;
  generating, based on the at least some of the information carried in the broadcast channel, the sequence of the reference signal, the sequence of the synchronization signal, or the sequence of the measurement signal; or
  selecting, based on the at least some of the information carried in the broadcast channel, the sequence of the reference signal, the sequence of the synchronization signal, or the sequence of the measurement signal from the plurality of candidate sequences of the reference signal, the plurality of candidate sequences of the synchronization signal, or the plurality of candidate sequences of the measurement signal, respectively.

5. The signal sending method according to claim 3, further comprising at least one of the following:
  determining, based on the at least some of the information carried in the data channel and a third corresponding mapping, the sequence of the reference signal or the sequence of the random access signal;
  determining, based on the at least some of the information carried in the data channel and a fourth corresponding mapping, a plurality of candidate sequences of the reference signal or a plurality of candidate sequences of the random access signal, and selecting the sequence of the reference signal or the sequence of the random access signal from the plurality of candidate sequences of the reference signal or the plurality of candidate sequences of the random access signal, respectively;
  generating, based on the at least some of the information carried in the data channel, the sequence of the reference signal or the sequence of the random access signal; or
  selecting, based on the at least some of the information carried in the data channel, the sequence of the reference signal or the sequence of the random access signal from the plurality of candidate sequences of the reference signal or the plurality of candidate sequences of the random access signal, respectively.

6. The signal sending method according to claim 1, wherein the timing information further comprises at least one of the following:
  an identifier of the first signal, an identifier of a transmission direction, or an identifier of a resource set to which the first signal belongs.

7. The signal sending method according to claim 6, wherein the resource set comprises at least one of the following:
  time domain resources occupied by N first signals;
  frequency domain resources occupied by the N first signals;
  a frequency domain range to which the N first signals belong; or
  a time range to which the N first signals belong, wherein N is a positive integer.

8. The signal sending method according to claim 2, wherein the first signal is used to perform at least one of the following:
  synchronization;
  measurement;
  power control;
  directional information providing; or
  directional information obtaining;
  wherein the directional information comprises a quasi co-location relationship.

9. The signal sending method according to claim 1, wherein the sidelink resource configuration information further indicates a non-sidelink resource part.

10. The signal sending method according to claim 9, wherein the sidelink resource configuration information is in at least one of the following forms:
  a bitmap;
  a resource pattern identifier; or
  a resource identifier.

11. The signal sending method according to claim 1, wherein the first signal further comprises at least one of the following:
  power information; or
  subsequent communication information.

12. The signal sending method according to claim 11, wherein the subsequent communication information comprises at least one of the following:
  configuration information of subsequent communication; or
  a mapping relationship between the first signal and a resource of a resource pool.

13. A signal receiving method applied to a receiving device, comprising:
  receiving a first signal from a sending device, wherein the first signal comprises the following information:
  timing information; or
  resource configuration information,
  wherein the timing information comprises frame information and slot information, the frame information comprises direct frame number (DFN) information, and the slot information comprises a slot index; and
  wherein the resource configuration information comprises:
    uplink and downlink resource configuration information indicating uplink format information within a period of time, downlink format information within the period of time, and/or feasible format information within the period of time; and
    sidelink resource configuration information indicating a sidelink resource part.

14. The signal receiving method according to claim 13, wherein a broadcast channel carries the at least some of the information comprised in the first signal; or
  a data channel carries the at least some of the information comprised in the first signal.

15. The signal receiving method according to claim 13, wherein the timing information further comprises at least one of the following:
 an identifier of the first signal, an identifier of a transmission direction, or an identifier of a resource set to which the first signal belongs.

16. The signal receiving method according to claim 13, wherein the sidelink resource configuration information further indicates a non-sidelink resource part.

17. The signal receiving method according to claim 16, wherein the sidelink resource configuration information is at least one of the following forms:
 a bitmap;
 a resource pattern identifier; or
 a resource identifier.

18. A network node, comprising a memory, a processor, and a computer program that is stored in the memory, wherein the computer program, when executed by the processor, implements a signal sending method comprising:
 sending a first signal to a receiving device; or
 receiving the first signal from a sending device,
 wherein the first signal comprises the following information: timing information; and resource configuration information;
 wherein the timing information comprises frame information and slot information, the frame information comprises direct frame number (DFN) information, and the slot information comprises a slot index; and
 wherein the resource configuration information comprises:
  uplink and downlink resource configuration information indicating uplink format information within a period of time, downlink format information within the period of time, and/or feasible format information within the period of time; and
  sidelink resource configuration information indicating a sidelink resource part.

19. The network node according to claim 18, wherein:
 a broadcast channel carries the at least some of the information comprised in the first signal; or
 a data channel carries the at least some of the information comprised in the first signal.

20. The network node according to claim 18, wherein the timing information further comprises at least one of the following:
 an identifier of the first signal, an identifier of a transmission direction, or an identifier of a resource set to which the first signal belongs.

* * * * *